(12) United States Patent
Shah (10) Patent No.: US 9,129,643 B2
(45) Date of Patent: Sep. 8, 2015

(54) METHOD AND APPARATUS FOR CREATING A MEDIA SEQUENCE WITH AUTOMATIC SELECTION OF AN OPTIMAL SEQUENCE PRESET

(71) Applicant: Adobe Systems Inc., San Jose, CA (US)

(72) Inventor: Abhishek Shah, Pitam Pura (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 226 days.

(21) Appl. No.: 13/621,451

(22) Filed: Sep. 17, 2012

(65) Prior Publication Data

US 2014/0079278 A1   Mar. 20, 2014

(51) Int. Cl.
*G06K 9/00* (2006.01)
*G11B 27/034* (2006.01)
*G11B 27/28* (2006.01)

(52) U.S. Cl.
CPC .............. *G11B 27/034* (2013.01); *G11B 27/28* (2013.01)

(58) Field of Classification Search
None
See application file for complete search history.

(56) References Cited

U.S. PATENT DOCUMENTS

| 8,839,110 | B2 * | 9/2014 | Wang et al. | 715/723 |
| 8,934,759 | B2 * | 1/2015 | Kikuchi | 386/278 |
| 2004/0212731 | A1 * | 10/2004 | Sie et al. | 348/445 |
| 2008/0019661 | A1 * | 1/2008 | Obrador et al. | 386/52 |
| 2008/0075388 | A1 * | 3/2008 | Nishijima | 382/282 |
| 2010/0158325 | A1 * | 6/2010 | Piramuthu et al. | 382/118 |

OTHER PUBLICATIONS

HRV. "Windows Live Movie Maker Tutorial Introduction" Multimedia Studios, Sep. 22, 2010, hereinafter HRV.*
Blender: ("Doc:2.4/Tutorials/Sequencer/Examples 2", BlenderWiki, Apr. 17, 2012, hereafter referred to as Blender).*
Serif ("MoviePlus 5 User Guide", 13 Columbia Drive, Suite 5, Amherst, NH 03031, 2005, hereafter referred to as Serif).*

* cited by examiner

*Primary Examiner* — Bhavesh Mehta
*Assistant Examiner* — Oneal R Mistry
(74) *Attorney, Agent, or Firm* — Keller Jolley Preece (57) ABSTRACT

A method and apparatus for creating a media sequence with an optimal sequence preset comprising accessing a plurality of media, wherein each media file in the plurality of media files comprises at least one frame comprising at least one object; calculating a sequence perimeter based on a union of a plurality of calculated frame perimeters for the plurality of media files, wherein the frame perimeter comprises each of the at least one objects in the at least one frame of the plurality of files; determining a sequence preset within a threshold of the calculated sequence perimeter; creating a sequence using the determined sequence preset; importing into the sequence that portion of the at least one frame of each media file in the plurality of media files that is within the calculated frame perimeter; and aligning each calculated frame perimeter of each file imported into the sequence with the sequence preset.

20 Claims, 5 Drawing Sheets

METHOD AND APPARATUS FOR CREATING A MEDIA SEQUENCE WITH AUTOMATIC SELECTION OF AN OPTIMAL SEQUENCE PRESET

BACKGROUND OF THE INVENTION

1. Field of the Invention

Embodiments of the present invention generally relate to multimedia content creation, and more particularly, to a method and apparatus for creating a media sequence with automatic selection of an optimal sequence preset.

2. Description of the Related Art

Video editing is a common task for many camera users. Various video editors are available for combining media content into a video sequence, such as ADOBE® PREMIERE® Pro CS6 and ADOBE® PREMIERE® Elements. These video editors allow a user to combine media content, such as video clips, still images, graphics, audio, and the like into a final sequence. Generally, the different media content has different resolutions and/or frame size. However, the final sequence has a single frame size, called a preset frame size. When the media content has a frame size that is smaller than the preset frame size set by the user, hereinafter called a sequence preset, black color is used to fill the empty space around the media content. This is known as letterboxing or pillar boxing. When the media content has a frame size that is larger than the sequence preset, part of the media content is cut off in order to make it fit into the preset size. Neither of these is a desirable result for displaying content.

Currently, a user may select a sequence preset, but the user must manually adjust each media file to fit into the sequence preset. This process is time consuming and cumbersome. Also, a novice user is unaware of which sequence preset is optimal for their final sequence.

Therefore, there is a need for a method and apparatus for creating a media sequence with automatic selection of an optimal sequence preset.

SUMMARY OF THE INVENTION

A method and apparatus for selecting an optimal sequence preset and creating a sequence from a plurality of media files substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

While the method and apparatus is described herein by way of example for several embodiments and illustrative drawings, those skilled in the art will recognize that the method and apparatus for creating a media sequence with automatic selection of an optimal sequence preset are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the method and apparatus for creating a media sequence with automatic selection of an optimal sequence preset as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for creating a media sequence with automatic selection of an optimal sequence preset. Media files are imported into a video editor to create a sequence. A sequence has a preset resolution and/or frame size, referred to as a sequence preset. A media file may comprise a still image or a video clip. Media files contain objects. The method looks at each frame of a media file and determines a perimeter around all significant objects in the frame. Exemplary embodiments of the invention are discussed in terms of a rectangular perimeter around the objects in a frame. However, it will be understood by those skilled in the art that the claimed subject matter may be practiced using perimeters of other shapes, such as squares, and the exemplary embodiments discussed in terms of perimeters are not intended to limit or obscure the claimed subject matter.

The method calculates a smallest rectangular perimeter in which all significant objects in the frame are contained, called a "frame perimeter". After a frame perimeter is calculated for each frame in the media file, the method determines the union of the frame perimeters to calculate a smallest rectangular perimeter that encompasses all significant objects for all frames of the media file, hereinafter called a "file perimeter". After a file perimeter is calculated for each media file, the method determines the union of the file perimeters to calculate a smallest rectangular perimeter that encompasses all significant objects of all of the media files, hereinafter called a "sequence perimeter". The method then finds a sequence preset (or frame size) that matches or is nearest to the sequence perimeter. The method creates a final sequence based on this sequence preset by importing the media contained within the plurality of calculated frame perimeters for each of the plurality of media files as frames into the final sequence while aligning each imported frame with the sequence preset. The aligning can optionally zoom the imported frame to further align it with the sequence preset.

A user imports media files into a video editor to create a sequence. For each frame of each media file, whether it is an image or a video clip, the method determines if there are any faces in the frame. If at least one face is found, the method creates a perimeter around the face and then expands the perimeter to include the person's body. The method then calculates perimeters for all other (non-face) objects in the frame. The method then calculates a union of these perimeters to create a "frame perimeter" that encompasses all of the perimeters in the frame. A frame perimeter is calculated for each frame of a media file. The method calculates a union of the frame perimeters from each frame of the media file to create a single file perimeter that encompasses all relevant objects in the media file. When a file perimeter is calculated for each imported media file, the method calculates a union of the file perimeters of each of the media files to create a single sequence perimeter that encompasses all relevant objects in all frames of all media files in the sequence. A sequence preset that matches or is nearest to the sequence perimeter size is chosen as the sequence preset. A final sequence is created based on the sequence preset and all media file content within the frame perimeter are imported into the final sequence.

Embodiments of the present invention provide a method and apparatus for creating a media sequence with automatic selection of an optimal sequence preset. Advantageously, a resultant sequence preset is the best fit for the imported media files and the positioning of imported frames on the sequence provides the best compositions with minimal letterboxing and loss of important data.

Various embodiments of an apparatus and method creating a media sequence with automatic selection of an optimal sequence preset are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
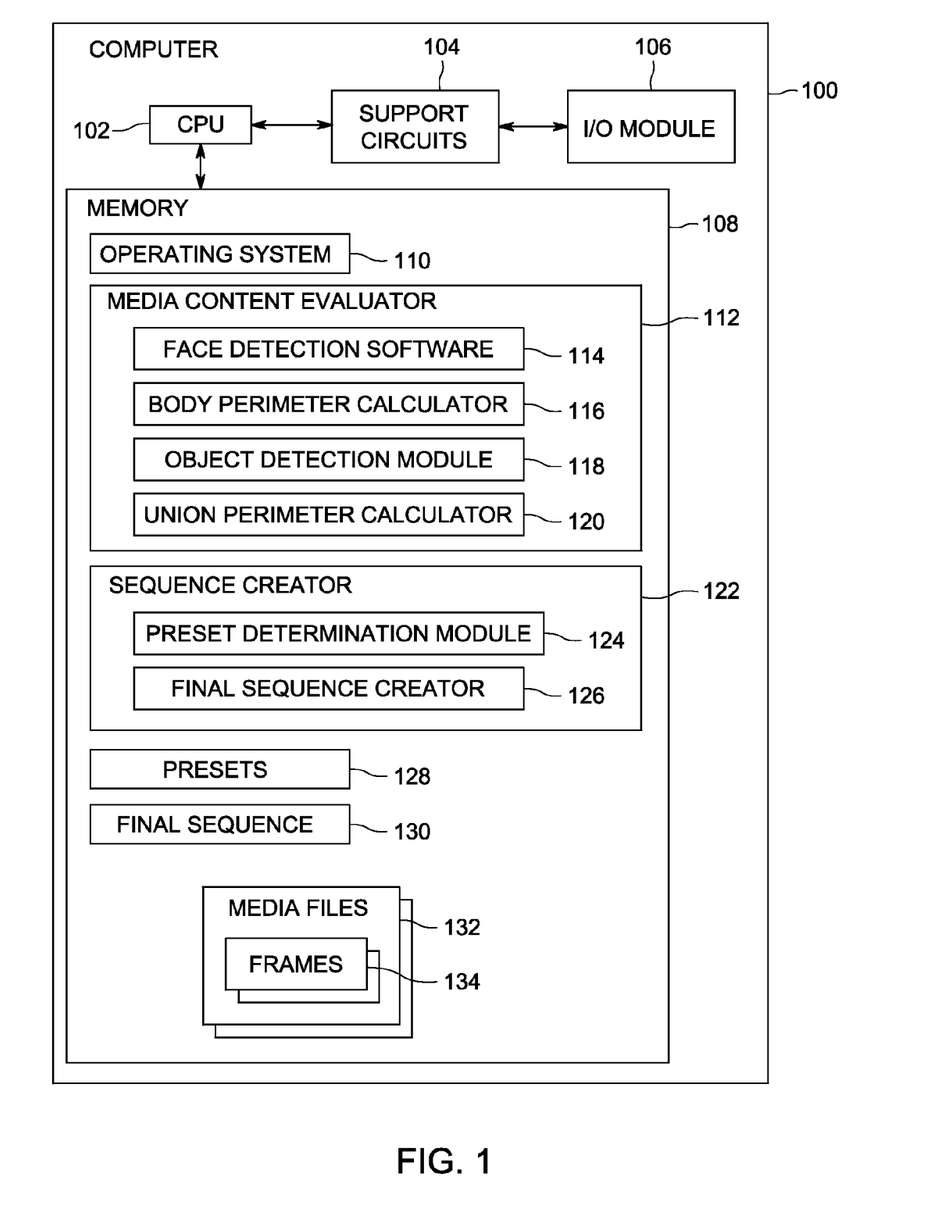
FIG. 1 depicts a block diagram of a computing system for creating a media sequence with automatic selection of an optimal sequence preset, according to one or more embodiments of the invention.

FIG. 1 depicts a block diagram of a computing system 100 for creating a media sequence with automatic selection of an optimal sequence preset, according to one or more embodiments of the invention.

The computing system 100 comprises a CPU 102, support circuits 104, an input/output (I/O) module 106 and a memory 108. The computing system 100 is a type of computing device (e.g., a laptop, a desktop, a Personal Digital Assistant (PDA) and/or the like). The CPU 102 may comprise one or more commercially available microprocessors or microcontrollers that facilitate data processing and storage. The various support circuits 104 facilitate the operation of the CPU 102 and include one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system 110, a media content evaluator 112, a sequence creator 122, presets 128, a final sequence 130, and media files 132. The media content evaluator 112 comprises face detection software 114, a body perimeter calculator 116, an object detection module 118, and a union perimeter calculator 120. The sequence creator 122 comprises a preset determination module 124 and a final sequence creator 126. The media file 132 comprises media content, such as an image, a video, a combination of audio and video, and the like. The media file 132 comprises at least one frame 134.

The operating system 110 generally manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. Examples of the operating system 110 may include, but are not limited to, Linux, Mac OSX, BSD, UNIX, Microsoft Windows, and the like.

The face detection software 114 is any software program capable of face detection and providing rectangles around detected faces, such as ADOBE® PHOTOSHOP® Elements.

The media content evaluator 112 evaluates each frame 134 in a media file 132. A media file 132 containing a still image comprises one frame 134. A media file 132 containing a video clip comprises a plurality of frames 134. The face detection software 114 determines whether there are any faces in the frame 134. The face detection software 114 generates a perimeter around each detected face. If there are faces detected in the frame 134, the body perimeter calculator 116 determines the orientation of each face and expands the perimeter that is drawn around the face to include a body of a person associated with the face. The body perimeter calculator 116 determines where a mouth is in relation to eyes on the face to determine the orientation. The body perimeter calculator 116 expands the perimeter in an appropriate direction based on the orientation of the face. In some embodiments, the body perimeter calculator 116 expands the perimeter by a predefined percentage, for example, by 300%. The object detection module 118 determines if the frame 134 contains other (non-face) objects. If the frame 134 contains objects, the object detection module 118 draws a perimeter around each detected object.

A union perimeter calculator 120 determines the union of all perimeters in the frame 134. The union perimeter calculator 120 calculates a smallest rectangular perimeter that encompasses all expanded perimeters around the bodies of people in the frame 134 and all object in the frame 134, hereinafter called a frame perimeter. The media content evaluator 112 repeats this process and calculates a frame perimeter for each frame 134 in the media file 132. When a frame perimeter has been calculated for each frame 134 in a media file 132, the union perimeter calculator 120 calculates the union of all frame perimeters. The union perimeter calculator 120 calculates a smallest perimeter that encompasses all frame perimeters for the media file 132, hereinafter called a file perimeter.

When the union perimeter calculator has calculated a file perimeter for each media file 132, the union perimeter calculator 120 next determines the union of all file perimeters. The union perimeter calculator 120 calculates a smallest perimeter that encompasses all file perimeters, hereinafter called a sequence perimeter.

When all media files have been evaluated and the union perimeter calculator 120 has calculated the sequence perimeter, the sequence creator 122 assembles the media files 132 to create the final sequence 130. The preset determination module 124 determines a sequence preset having a frame size equal to or closest to the frame size of the calculated sequence perimeter. For example, if the size of the sequence perimeter is 1440×1080 pixels, then the preset determination module 124 selects a sequence preset that is closest to this value. The preset determination module 124 selects a sequence preset from a file of presets 128. The preset determination module 124 picks a sequence that is either equal to or closest to the calculated sequence perimeter.

The final sequence creator 130 creates a final sequence 130 by importing the media contained within the frame perimeter for each frame of each media file 132. Further, the final sequence creator 130 aligns each frame perimeter of each imported media file 132 with the sequence preset and can optionally zoom the frame perimeter to further align its size with the size of the sequence preset.

Figure 2:
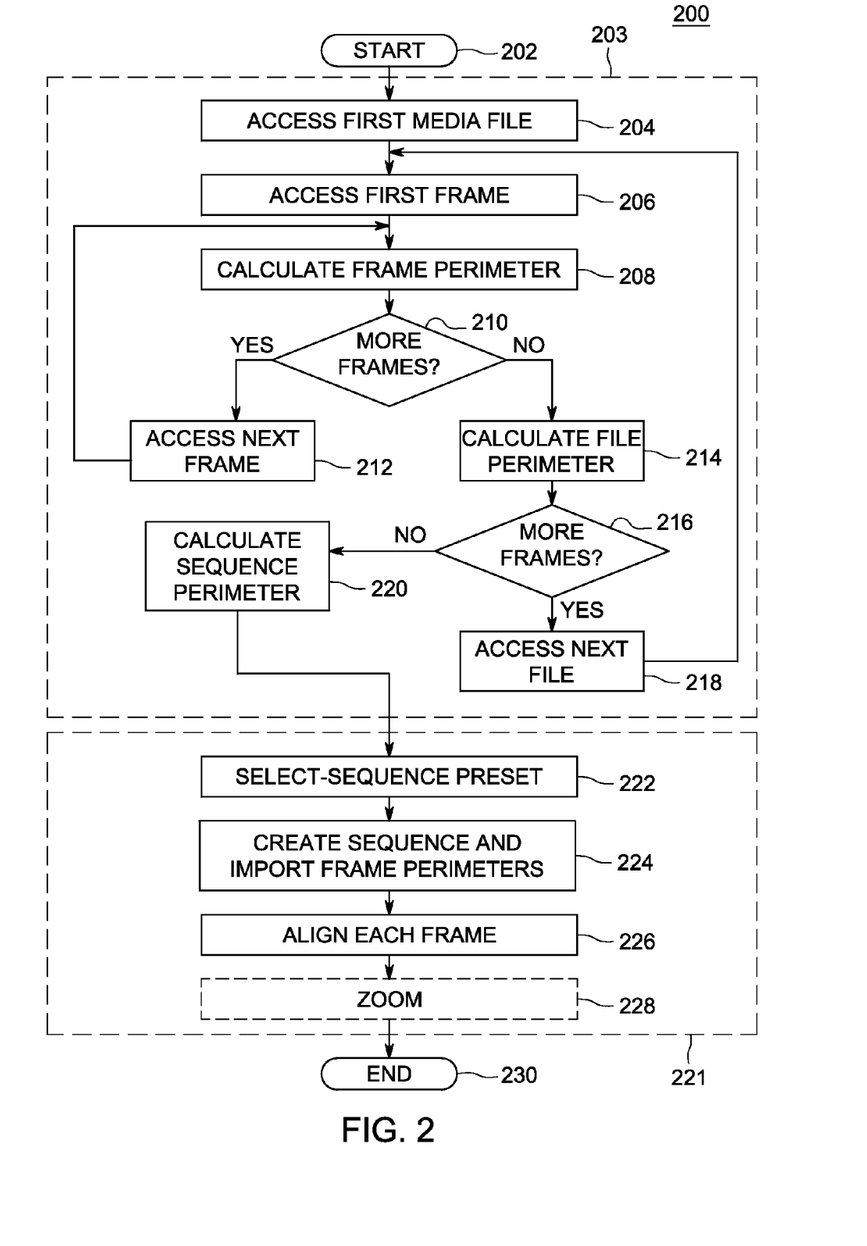
FIG. 2 depicts a flow diagram of a method for creating a media sequence with automatic selection of an optimal sequence preset as performed by the media content evaluator and sequence creator of FIG. 1, according to one or more embodiments.

FIG. 2 depicts a flow diagram of a method 200 for creating a media sequence with automatic selection of an optimal sequence preset. The steps within block 203 are performed by the media content evaluator 112. The steps within block 221 are performed by the sequence creator 122 of FIG. 1, according to one or more embodiments. The method 200 accesses each frame of each media file and selects an optimal sequence preset, which the method 200 then uses to create a final sequence.

The method 200 starts at step 202 and proceeds to step 204. At step 204, the method 200 accesses a first media file. Media files are imported into a video editor to create an original sequence. Each media file may comprise either a still image or a video clip. A still image comprises one frame. A video clip comprises a plurality of frames. The method 200 proceeds to step 206, where the method 200 accesses a first frame of the media file. The method proceeds to step 208, where the method 200 calculates a frame perimeter for the frame as described in further detail with respect to FIG. 3 below.

The method 200 proceeds to step 210, where the method 200 determines whether there are more frames in the media file. If the method 200 determines there are more frames in the media file, the method 200 proceeds to step 212, where the method 200 accesses the next frame in the media file. The method 200 proceeds to step 208 and iterates until a frame perimeter has been calculated for each frame in the media file. When there are no more frames in the media file to evaluate, the method 200 proceeds to step 214.

At step 214, the method 200 determines a file perimeter for the entire media file. The method 200 accesses the frame perimeters for each frame in the media file and calculates as a file perimeter a smallest perimeter that encompasses a union of all of the frame perimeters. The method 200 stores the file perimeter for the media file.

The method 200 proceeds to step 216, where the method 200 determines if there are more media files. If there are more media files, the method 200 proceeds to step 218 where the method 200 accesses the next media file and then proceeds to step 206, where the method 200 iterates until all frames of all media files have be evaluated. When there are no more media files to evaluate, the method 200 proceeds to step 220, where the method 200 calculates a sequence perimeter for all of the media files. The method 200 accesses the file perimeters for each media file and determines a sequence perimeter that encompasses a union of all of the file perimeters from all of the media files. The method 200 stores the sequence perimeter.

The method 200 proceeds to step 222, where the method 200 determines a sequence preset. The method 200 selects a sequence preset from a file of available presets. The method 200 selects a sequence preset that is either equal to or closest to the size of the calculated sequence perimeter.

The method 200 proceeds to step 224, where, the method 200 creates a sequence and imports the media contained within each frame perimeter for each of the media files. The method 200 creates a new sequence in the video editor. The original sequence in left unchanged. The method 200 proceeds to step 226, where the method 200 aligns each frame perimeter of each imported media file to a reference position in the sequence preset frame size, such as coordinates (0,0), a top left corner in the frame. The method 200 proceeds to step 228, where the method 200 optionally refines the alignment of step 226 by comparing the sequence preset to the preset of the original media file. If the sequence preset is different from the preset of the original media file, the method 200 zooms the frame (larger or smaller) to align its size the sequence preset frame size. The method 200 proceeds to step 230 and ends.

Figure 3:
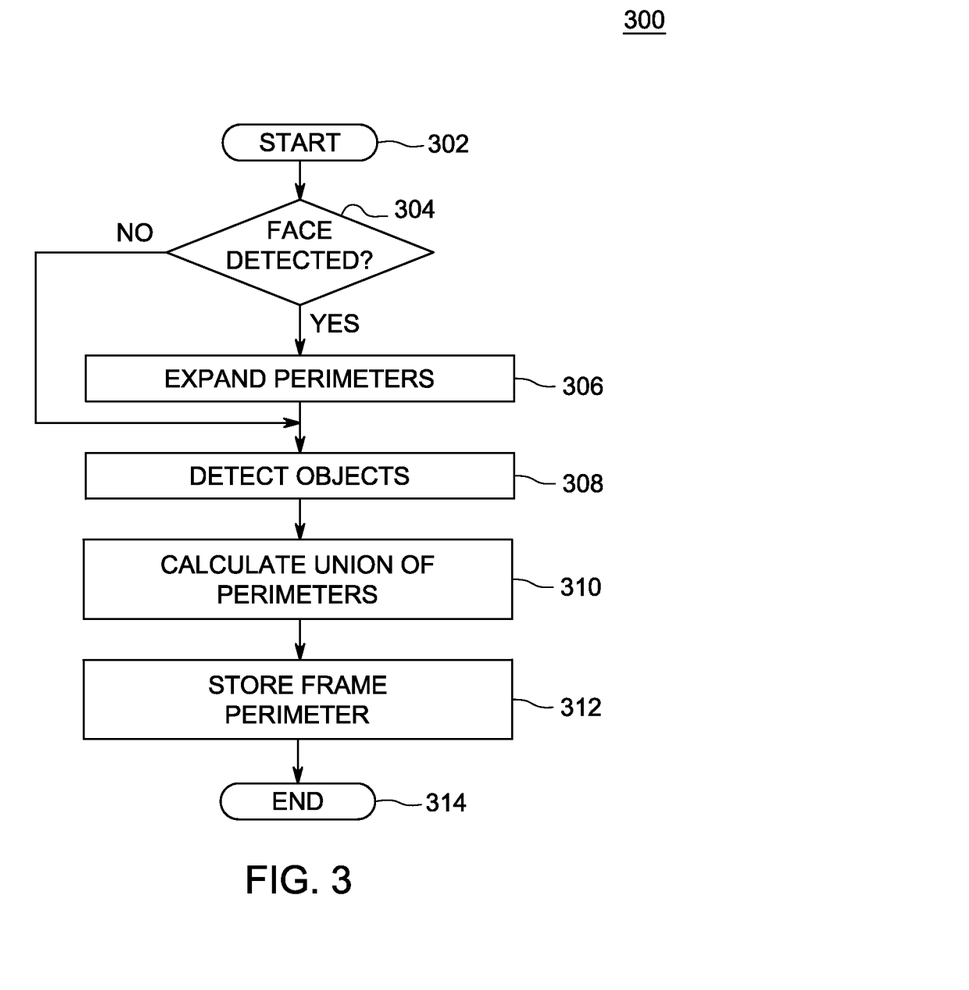
FIG. 3 depicts a flow diagram of a method for calculating a union perimeter for a frame of a media file as performed by the union perimeter calculator of FIG. 1, according to one or more embodiments.

FIG. 3 depicts a flow diagram of a method 300 for calculating a frame perimeter as performed by the union perimeter calculator 120 of FIG. 1, according to one or more embodiments of the invention. The method 300 finds all significant objects in a frame and calculates a smallest frame perimeter that encompasses all of the significant objects.

The method 300 starts at step 302, and proceeds to step 304. At step 304, the method 300 determines if there are any faces in the frame. The method 300 utilizes commercial face detection software. If there are faces in the frame, the face detection software puts perimeters around the faces found in the frame, called a "face perimeter". If the method 300 determines that there are faces in the frame, the method 300 proceeds to step 306, where the method 300 expands the face perimeters. For each face perimeter, the method 300 determines the orientation of the face and expands the face perimeter in accordance with the orientation of face such that the face perimeter occupies an entire body of a person in the frame. In some embodiments, the method 300 expands the perimeter by a predetermined percentage, such as 300%. The method 300 proceeds to step 308.

However, if at step 304, the method 300 determines there are no faces in the frame, the method 300 proceeds to step 308. At step 308, the method 300 finds other (non-face) objects in the frame that may be significant. The method 300 generates a perimeter encompassing each (non-face) object. The method 300 proceeds to step 310, where the method 300 calculates a union of the perimeters around any bodies and the perimeters around any objects. The calculated frame perimeter is a smallest perimeter that encompasses all perimeters in the frames and as a result encompasses all significant persons and objects in the frame. The method 300 proceeds to step 312, where the method 300 stores the frame perimeter for the frame. The method 300 proceeds to step 314 and ends.

FIGS. 4A-4F together depict an illustration of the method 300 for calculating a frame perimeter for a media file as performed by the union perimeter calculator 120 of FIG. 1, according to one or more embodiments of the invention. The media file being evaluated comprises a still image, that is, single media frame 402 having a first person 404, a second person 406, and an object 408. In some embodiments, the media frame may be of any specific resolution.

Figure 4A:
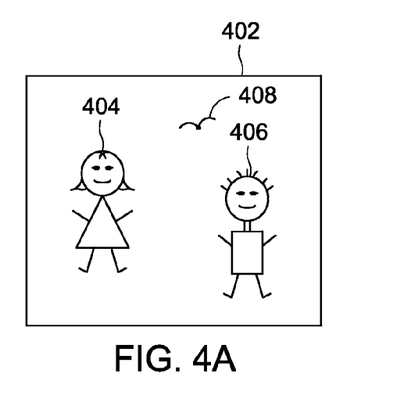
FIGS. 4A-4F together depict an illustration of the method for calculating a frame perimeter as performed by the union perimeter calculator of FIG. 1, according to one or more embodiments of the invention.

FIG. 4A depicts media frame 402 having the first person 404, the second person 406, and the object 408.

Figure 4B:
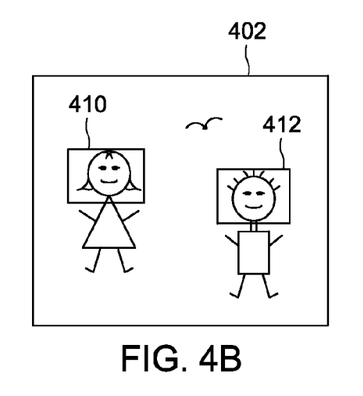

FIG. 4B depicts a face detection operation, wherein the face detection software 114 of FIG. 1 detects the faces of the people 404, 406 in the media frame 402 and generates a perimeter 410, 412 around each detected face.

Figure 4C:
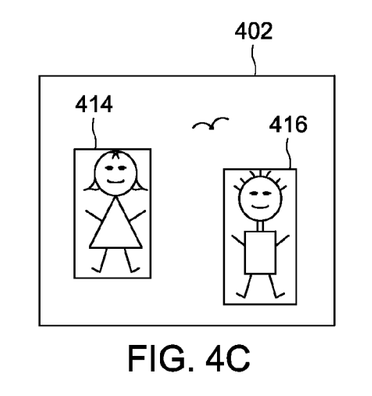

FIG. 4C depicts expanded perimeters 414, 416 that are generated based on the orientation of the faces in the perimeters 410, 412.

Figure 4D:
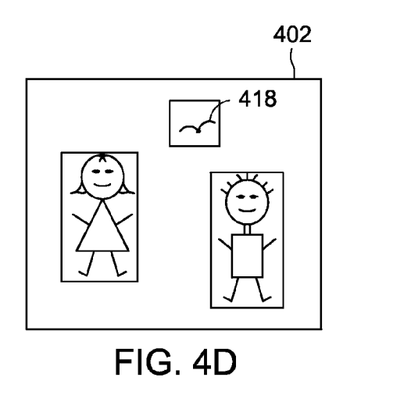

FIG. 4D depicts an object detection operation, wherein perimeters are generated around the (non-face) object 418 in the media frame 402.

Figure 4E:
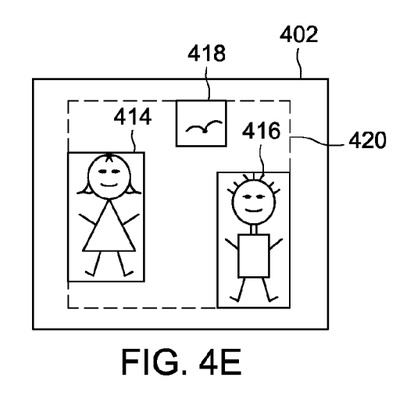

FIG. 4E depicts calculating a union perimeter as a frame perimeter 420. The frame perimeter 420 is calculated using a union of all perimeters, generated for the media frame 402. The frame perimeter 420 is a smallest rectangular perimeter 420 that encompasses all of the perimeters, specifically the expanded perimeters 414, 416 and the perimeters around the objects 418 and calculates a frame perimeter 420 that contains all of those perimeters 414, 416, 418.

Figure 4F:
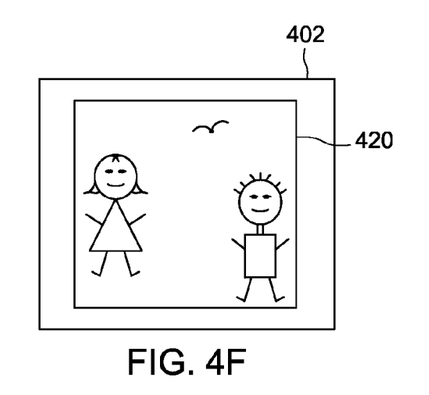

FIG. 4F depicts the calculated frame perimeter 420.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
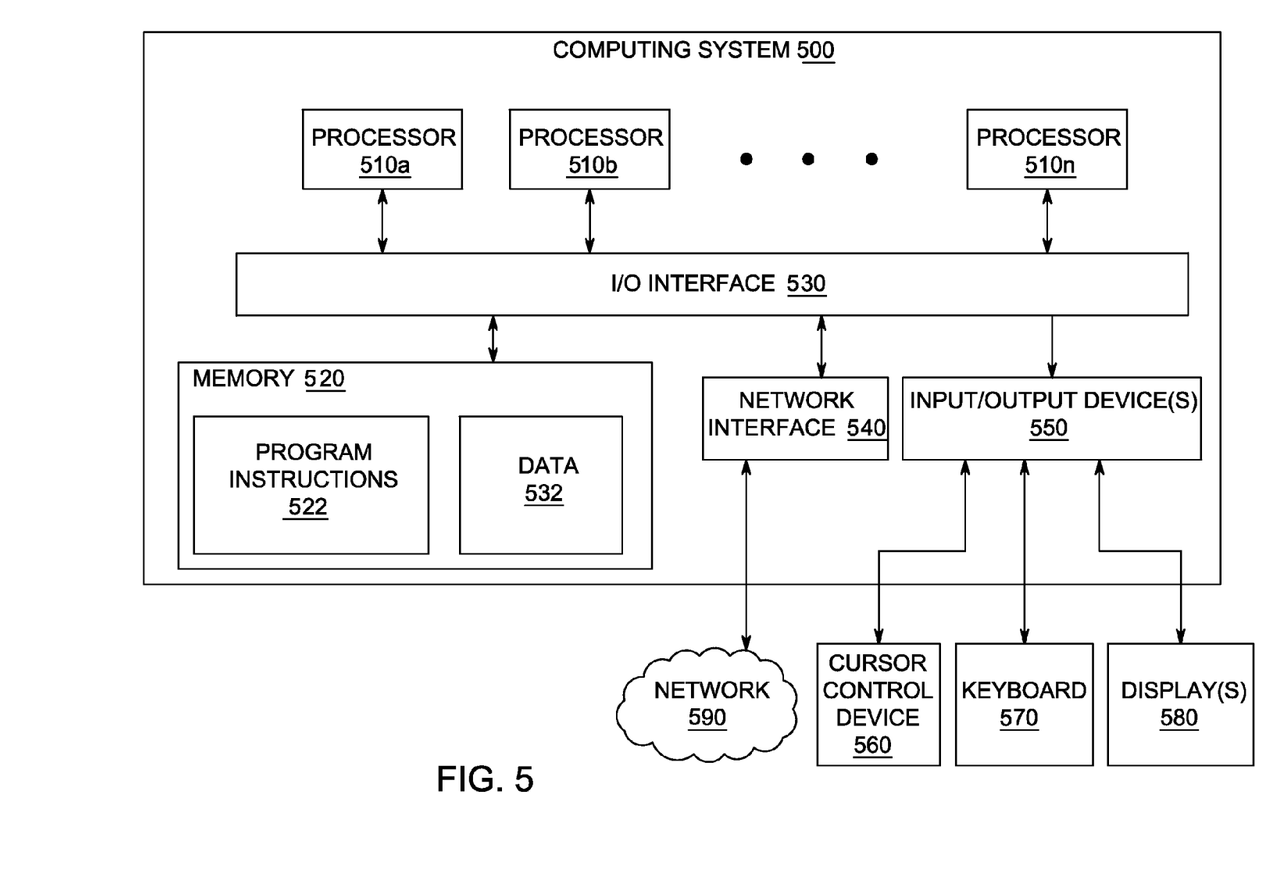
FIG. 5 depicts a computer system that can be utilized in various embodiments of the present invention, according to one or more embodiments.

FIG. 5 depicts a computer system that can be used to implement the methods of FIGS. 2-3 in various embodiments of the present invention, according to one or more embodiments of the invention. FIG. 5 depicts a computer system that can be utilized in various embodiments of the present invention to implement the computer 102, according to one or more embodiments.

Various embodiments of method and apparatus for creating a media sequence with automatic selection of an optimal sequence preset, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of these components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC®, SPARC®, or MIPS® ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIGS. 2-3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for creating a sequence from a plurality of media files, the method comprising:
  accessing the plurality of media files, wherein each media file of the plurality of media files comprises at least one frame comprising at least one object;
  for the at least one frame of each of the plurality of media files, determining, by at least one processor, a frame perimeter with a smallest size that encompasses the at least one object in the at least one frame of each of the plurality of media files by:
    accessing the at least one frame;
    determining whether at least one face exists in the at least one frame;
    calculating a body perimeter that encompasses a body associated with the at least one face when the at least one face is detected;
    determining the frame perimeter such that the frame perimeter has a smallest size that encompasses the calculated body perimeter;
  calculating, by the at least one processor, a sequence perimeter with a smallest size that encompasses all of the frame perimeters determined for the plurality of media files;
  determining, by the at least one processor, a sequence preset frame perimeter based on the calculated sequence perimeter; and
  creating the sequence using the determined sequence preset frame perimeter by:
    importing into the sequence that portion of the at least one frame of each media file in the plurality of media files that is within the calculated frame perimeter; and
    aligning each calculated frame perimeter of each file imported into the sequence with the determined sequence preset frame perimeter.

2. The method of claim 1, where aligning each calculated frame perimeter of each file imported into the sequence with the determined sequence preset frame perimeter comprises positioning the portion of the at least one frame of each imported media file in the plurality of media files that is within the calculated frame perimeter to a predetermined position in the sequence preset frame perimeter.

3. The method of claim 1, wherein the plurality of media files comprises a plurality of media files having various frame sizes, and wherein aligning each calculated frame perimeter of each file imported into the sequence with the determined sequence preset frame perimeter further comprises zooming the frame perimeter of the at least one frame of each imported media file in the plurality of media files to align the size of the frame perimeter of the at least one frame of each imported media file in the plurality of media files with the size of the sequence preset frame perimeter.

4. The method of claim 1, wherein calculating the sequence perimeter with the smallest size that encompasses all of the frame perimeters determined for the plurality of media files comprises calculating a file perimeter for each media file in the plurality of media files, and wherein the file perimeter is a smallest size that encompasses all of the calculated frame perimeters for each media file.

5. The method of claim 1, wherein determining whether the at least one face exists in the at least one frame comprises utilizing face detection software to evaluate the at least one frame.

6. The method of claim 5, wherein a face perimeter is generated around the at least one face when a face is detected.

7. The method of claim 6, wherein calculating the body perimeter that encompasses a body associated with the at least one face comprises:
  determining an orientation of the at least one face;
  expanding the face perimeter around the at least one face by a first predefined percentage in a first direction aligned with the orientation of the at least one face; and
  expanding the face perimeter around the at least one face by a second predefined percentage in a second direction perpendicular with the orientation of the at least one face.

8. An system for creating a media sequence with automatic selection of an optimal sequence preset frame perimeter, the system comprising:
  at least one processor; and
  at least one non-transitory computer readable storage medium storing instructions thereon that, when executed by the at least one processor, cause the system to perform the steps of:
  accessing a plurality of media files in a first sequence, wherein each media file in the plurality of media files comprises at least one frame comprising at least one object;
  determining a frame perimeter with a smallest size that encompasses the at least one object in the at least one frame of each the plurality of media files by:

accessing the at least one frame;
determining whether at least one face exists in the at least one frame;
calculating a body perimeter that encompasses a body associated with the at least one face when the at least one face is detected;
determining the frame perimeter such that the frame perimeter has a smallest size that encompasses the calculated body perimeter;
calculating a sequence perimeter with a smallest size that encompasses all of the frame perimeters determined for the plurality of media files;
determining a sequence preset frame perimeter based on the calculated sequence perimeter; and
creating a second sequence using the determined sequence preset frame perimeter by importing into the second sequence that portion of the at least one frame of each media file in the plurality of media files that is within the calculated frame perimeter, and by aligning each calculated frame perimeter of each file imported into the second sequence with the determined sequence preset frame perimeter, wherein aligning each calculated frame perimeter of each file imported into the sequence with the determined sequence preset frame perimeter comprises positioning the portion of the at least one frame of each imported media file in the plurality of media files that is within the calculated frame perimeter to a predetermined position in the sequence preset frame perimeter.

9. The system of claim 8, wherein the plurality of media files comprises a plurality of media files having various frame sizes, and wherein aligning each calculated frame perimeter of each file imported into the sequence with the determined sequence preset frame perimeter comprises zooming the frame perimeters of the at least one frame of each imported media file in the plurality of media files imported into the second sequence to further align the size of the frame perimeters of the at least one frame of each imported media file in the plurality of media files with the size of the sequence preset frame perimeter.

10. The system of claim 8, wherein calculating the sequence perimeter with the smallest size that encompasses all of the frame perimeters determined for the plurality of media files comprises calculating a file perimeter for each media file in the plurality of media files, and wherein the file perimeter is a smallest size that encompasses all of the calculated frame perimeters for each media file.

11. The system of claim 8, wherein determining whether at least one face exists in the at least one frame comprises utilizing face detection software for determining whether at least one face exists in the at least one frame.

12. The system of claim 11, wherein a face perimeter is generated around the at least one face when a face is detected.

13. The system of claim 12, wherein calculating the body perimeter that encompasses a body associated with the at least one face comprises:
determining an orientation of the at least one face;
expanding the face perimeter around the at least one face by a first predefined percentage in a first direction aligned with the orientation of the at least one face; and
expanding the face perimeter around the at least one face by a second predefined percentage in a second direction perpendicular with the orientation of the at least one face.

14. A computer-implemented method for automatic selection of an optimal frame perimeter to encompass objects in media files, the method comprising:
accessing a plurality of media files, wherein media files in the plurality of media files comprise at least one frame comprising at least one object;
for the at least one frames of the media files, determining a frame perimeter with a smallest size that encompasses the at least one object in the at least one frame of each of the media files in the plurality of media files by:
accessing the at least one frame;
determining whether at least one face exists in the at least one frame;
calculating a body perimeter that encompasses a body associated with the at least one face when the at least one face is detected;
calculating an object perimeter that encompasses at least one object in the frame:
determining the frame perimeter such that the frame perimeter has a smallest size that encompasses the calculated body perimeter and the calculated object perimeter for the at least one frame;
calculating, by at least one processor, a sequence perimeter with a smallest size that encompasses all of the frame perimeters determined for the media files of the plurality of media files;
determining a sequence preset frame perimeter based on the calculated sequence perimeter; and
creating the sequence using the determined sequence preset frame perimeter by:
importing into the sequence that portion of the at least one frame of each media file in the plurality of media files that is within the calculated frame perimeter; and
aligning each calculated frame perimeter of each file imported into the sequence with the determined sequence preset frame perimeter.

15. The method of claim 14, wherein the plurality of media files comprises a plurality of media files having various frame sizes.

16. The method of claim 14, wherein calculating the sequence perimeter with the smallest size that encompasses all of the frame perimeters determined for the plurality of media files comprises calculating a file perimeter for each media file in the plurality of media files, and wherein the file perimeter is a smallest size that encompasses all of the calculated frame perimeters for each media file.

17. The method of claim 16, wherein the object comprises a visual feature located within the at least one frame.

18. The method of claim 14, wherein determining whether at least one face exists in the at least one frame comprises utilizing face detection software to evaluate the at least one frame.

19. The method of claim 18, wherein a face perimeter is generated around the at least one face when a face is detected.

20. The method of claim 19, wherein calculating the body perimeter that encompasses a body associated with the at least one face comprises:
determining an orientation of the at least one face;
expanding the face perimeter around the at least one face by a first predefined percentage in a first direction aligned with the orientation of the at least one face; and
expanding the face perimeter around the at least one face by a second predefined percentage in a second direction perpendicular with the orientation of the at least one face.

* * * * *